(12) United States Patent
Barcelon et al.

(10) Patent No.: US 7,588,793 B1
(45) Date of Patent: Sep. 15, 2009

(54) ENHANCED FLAVORING COMPOSITIONS CONTAINING N-ETHYL-P-MENTHANE-3-CARBOXAMIDE AND METHOD OF MAKING AND USING SAME

(75) Inventors: Shirley Ann Barcelon, Randolph, NJ (US); Shiuh John Luo, Livingston, NJ (US); Jesse John Kiefer, Belvidere, NJ (US); Hector Olaya, Parsippany, NJ (US)

(73) Assignee: Cadbury Adams USA, LLC, Parsippany, NJ (US)

( * ) Notice: Subject to any disclaimer, the term of this patent is extended or adjusted under 35 U.S.C. 154(b) by 0 days.

(21) Appl. No.: 09/092,696

(22) Filed: Jun. 5, 1998

(51) Int. Cl.
*A23L 1/222* (2006.01)
*A23G 4/00* (2006.01)
(52) U.S. Cl. ............................ 426/651; 426/3; 426/534
(58) Field of Classification Search ................. 426/650, 426/651, 534, 3
See application file for complete search history.

(56) References Cited

U.S. PATENT DOCUMENTS

| | | |
|---|---|---|
| 3,857,964 A | 12/1974 | Yolles |
| 3,897,566 A | 7/1975 | Bahoshy et al. |
| 3,930,026 A | 12/1975 | Clark |
| 4,032,661 A | 6/1977 | Rowsell et al. |
| 4,060,091 A | 11/1977 | Watson et al. |
| 4,136,163 A | 1/1979 | Watson et al. |
| 4,193,936 A | 3/1980 | Watson et al. |
| 4,230,688 A | 10/1980 | Rowsell et al. |
| 4,271,197 A | 6/1981 | Hopkins et al. |
| 4,352,822 A | 10/1982 | Cherukuri et al. |
| 4,388,328 A | 6/1983 | Glass |
| 4,459,425 A | 7/1984 | Amano et al. |
| 4,485,118 A | 11/1984 | Carroll et al. |
| 4,497,832 A | 2/1985 | Cherukuri et al. |
| 4,568,560 A | 2/1986 | Schobel |
| 4,590,075 A | 5/1986 | Wei et al. |
| 4,751,095 A | 6/1988 | Karl et al. |
| 4,752,481 A | 6/1988 | Dokuzovic |
| 4,803,082 A | 2/1989 | Cherukuri et al. |
| 4,918,182 A | 4/1990 | Jackson et al. |
| 4,927,646 A | 5/1990 | Jenner et al. |
| 4,929,447 A | 5/1990 | Yang |
| 4,933,190 A | 6/1990 | Cherukuri et al. |
| 4,971,797 A | 11/1990 | Cherukuri et al. |
| 4,981,698 A | 1/1991 | Cherukuri et al. |
| 5,004,595 A | 4/1991 | Cherukuri et al. |
| 5,009,893 A | 4/1991 | Cherukuri et al. |
| 5,009,900 A | 4/1991 | Levine et al. |
| 5,041,294 A | 8/1991 | Patel |
| 5,158,790 A | 10/1992 | Witkewitz et al. |
| 5,244,670 A | 9/1993 | Upson et al. |
| 5,266,335 A | 11/1993 | Cherukuri et al. |
| 5,266,592 A | 11/1993 | Grub et al. |
| 5,284,659 A | 2/1994 | Cherukuri et al. |
| 5,372,824 A | 12/1994 | Record et al. |
| 5,405,604 A | 4/1995 | Hall et al. |
| 5,407,665 A | 4/1995 | McLaughlin et al. |
| 5,415,880 A | 5/1995 | Song et al. |
| 5,429,827 A | 7/1995 | Song et al. |
| 5,458,879 A | 10/1995 | Singh et al. |
| 5,545,424 A | 8/1996 | Nakatsu et al. |
| 5,603,971 A | 2/1997 | Porzio et al. |
| 5,633,027 A | 5/1997 | Cherukuri et al. |
| 5,725,865 A | 3/1998 | Mane et al. |
| 5,744,180 A | 4/1998 | Cherukuri et al. |
| 5,783,725 A | 7/1998 | Kuhn et al. |
| 5,800,848 A | 9/1998 | Yatka et al. |
| 6,159,509 A | 12/2000 | Johnson et al. |
| 6,306,429 B1 | 10/2001 | Bealin-Kelly |
| 6,379,652 B1 | 4/2002 | Liu et al. |
| 6,623,266 B2 | 9/2003 | Jani et al. |
| 6,627,233 B1 * | 9/2003 | Wolf et al. ..................... 426/3 |
| 6,673,844 B2 | 1/2004 | Kumamoto et al. |
| 6,780,443 B1 | 8/2004 | Nakatsu et al. |
| 2002/0044968 A1 | 4/2002 | Van Lengerich |
| 2002/0119231 A1 | 8/2002 | Kumamoto et al. |
| 2002/0150616 A1 | 10/2002 | Vandecruys |
| 2003/0215532 A1 | 11/2003 | Nakatsu et al. |
| 2004/0238993 A1 | 12/2004 | Benczedi et al. |
| 2005/0019445 A1 | 1/2005 | Wolf et al. |
| 2005/0196517 A1 | 9/2005 | Hodanko et al. |

FOREIGN PATENT DOCUMENTS

| | | |
|---|---|---|
| EP | 0255260 | 2/1988 |
| EP | 0434321 | 6/1991 |
| EP | 452273 | 10/1991 |
| EP | 0453397 | 10/1991 |
| EP | 888067 | 1/1999 |
| EP | 1003475 | 5/2000 |
| EP | 1121927 | 8/2001 |
| EP | 1215258 | 6/2002 |

(Continued)

*Primary Examiner*—Leslie Wong
(74) *Attorney, Agent, or Firm*—Hoffmann & Baron, LLP

(57) ABSTRACT

Enhanced flavoring compositions containing at least one flavoring agent and an effective amount of N-ethyl-p-menthane-3-carboxamide are provided. The N-ethyl-p-menthane-3-carboxamide is present at about 0.04 to about 2.2% by weight of the enhanced flavoring composition. The invention further concerns chewing gums and confectionery compositions containing a flavoring effective amount of the enhanced flavoring compositions.

4 Claims, No Drawings

FOREIGN PATENT DOCUMENTS

| | | |
|---|---|---|
| GB | 1351761 | 5/1974 |
| JP | 01206969 | 8/1989 |
| WO | 8503414 | 8/1985 |
| WO | 9004926 | 5/1990 |
| WO | 9202145 | 2/1992 |
| WO | 9323005 | 11/1993 |
| WO | 9325177 | 12/1993 |
| WO | 9507683 | 3/1995 |
| WO | 9511671 | 5/1995 |
| WO | 9603109 | 2/1996 |
| WO | 9617524 | 6/1996 |
| WO | 9702273 | 1/1997 |
| WO | 9706695 | 2/1997 |
| WO | 9803076 | 1/1998 |
| WO | 9852540 | 5/1998 |
| WO | 9847483 | 10/1998 |
| WO | 9852545 | 11/1998 |
| WO | 9913870 | 3/1999 |
| WO | 0200039 | 1/2002 |
| WO | 03063604 | 8/2003 |
| WO | 03106404 | 12/2003 |
| WO | 2004006967 | 1/2004 |
| WO | 2004064544 | 8/2004 |
| WO | 2005-082154 | 9/2005 |
| WO | 2006003349 | 1/2006 |
| WO | 2006039945 | 4/2006 |

* cited by examiner

ENHANCED FLAVORING COMPOSITIONS CONTAINING N-ETHYL-P-MENTHANE-3-CARBOXAMIDE AND METHOD OF MAKING AND USING SAME

BACKGROUND OF THE INVENTION

1. Field of the Invention

This invention relates to enhanced flavoring compositions containing N-ethyl-p-menthane-3-carboxamide, confectionery compositions and chewing gums containing the enhanced flavoring compositions and methods of making the same.

2. Description of the Prior Art

Much work has been done in the food arts to enhance the impact of the flavors used in confectionery products and chewing gums. Flavor ingredients for use in these end products have been coated, encapsulated, combined with other active and inactive ingredients, and the like. U.S. Pat. Nos. 3,857,964, 3,897,566, 3,930,026, 4,388,328, 4,485,118, 4,568,560, 4,590,075, 4,752,481, 4,803,082, 5,004,595, 5,041,294, 5,266,335 and 5,284,659 all concern aspects of flavor modification.

Much of the effort was directed toward control of flavor release in the end product, particularly in gum products. The release of the flavor from a food product is largely determined by the matrix of the food product. Gum products, having a matrix composed of an elastomeric gum base, corn syrup and sweetener, withhold flavor, usually at 60-75% of the amount of flavor used, the percentage depending somewhat on the flavor's affinity for the matrix. Higher amounts of flavors are therefore used in gums in order to provide a perceptible flavor effect.

Particular attention has been paid to enhancing the impact of fruit flavors in chewing gums. Because of their chemical makeup, fruit flavors have a particularly high affinity for gum base. Fruit flavors also have a light flavor quality which provides for a low flavor impact. U.S. Pat. No. 5,158,790, for example, teaches the use of L-carvone with fruit flavors to overcome these deficits and enhance sweetness and flavor. U.S. Pat. Nos. 5,415,888 and 5,429,827 teach the use of a polymer restrainer having a particular solubility parameter relative to the fruit flavor to control release.

The synergistic effects provided by the use of substances as flavor enhancers is also well known in the food arts. Synergism in flavoring is the addition of very small amounts of a non-specific material to accentuate the specific flavoring material. Known synergisms include for example, the use of citric acid in peppermint to accentuate the peppermint, vanilla in chocolate to accentuate the chocolate flavor, oil of lemon in molasses, oil of peppermint in licorice or anise, and the use of salt in most candies except butter flavored candies.

Cooling agents are compounds used in confectionery compositions and chewing gums for their cooling sensation and breath freshening effects with or without the presence of flavoring agents. Menthol is perhaps the best known cooling agent but one with well-known drawbacks such as high volatility, bitterness and a strong minty flavor. N-ethyl-p-menthane-3-carboxamide is also known as a cooling agent. U.S. Pat. No. 4,193,936 teaches N-ethyl-p-menthane-3-carboxamide as being less volatile than menthol and having little or no odor. U.S. Pat. Nos. 4,060,091, 4,136,163, and 5,405,604 teach the use of N-ethyl-p-menthane-3-carboxamide as a cooling agent in edible compositions. U.S. Pat. No. 5,009,893, U.S. Pat. No. 5,244,670, WO 93/23005 and WO 93/25177 all disclose use of N-ethyl-p-menthane-3-carboxamide as an adjuvant with other cooling agents including menthol. WO 97/06695 teaches however that compounds used as cooling agents all have a negative impact on flavors, particularly fruit flavors. WO 97/06695 further teaches that in order to avoid the problem, flavors and cooling agents must be formulated into distinct and discreet regions of the confectionery product.

Thus it is known to use N-ethyl-p-menthane-3-carboxamide to provide cooling effects and enhancement of breath freshening effects, particularly in mint-flavored gum and confectionery products. The food arts however do not teach the use of N-ethyl-p-menthane-3-carboxamide as a flavor enhancer. More specifically, the art does not teach the use of N-ethyl-p-menthane-3-carboxamide in combination with flavors, particularly in combination with fruit flavors, in gum and confectionery products, at levels which produce synergistic effects.

SUMMARY OF THE INVENTION

The present invention provides an enhanced flavoring composition comprising at least one flavoring agent and an amount of N-ethyl-p-menthane-3-carboxamide effective to enhance the flavoring agent wherein the N-ethyl-p-menthane-3-carboxamide is present at about 0.04 to about 2.2% by weight of the enhanced flavoring composition. The invention further concerns a method for enhancing a flavoring agent which comprises adding thereto an effective amount of N-ethyl-p-menthane-3-carboxamide at about 0.04 to about 2.2% by weight of the combination. The invention further concerns chewing gums and confectionery compositions containing a flavoring effective amount of the enhanced flavoring compositions.

DETAILED DESCRIPTION OF THE INVENTION

It has now surprisingly been found that N-ethyl-p-menthane-3-carboxamide can be used per se, as a flavor modifier to enhance the flavor of a flavoring agent. This synergistic effect is found when N-ethyl-p-menthane-3-carboxamide is used at low levels in combination with the flavoring agent. The character of the flavor is generally found to be sharper or brighter, punctuated, more defined and longer-lasting when compared with compositions containing the same flavoring agent without N-ethyl-p-menthane-3-carboxamide. The enhanced flavoring composition provides a long lasting flavor sensation to food compositions such as gums and confections, particularly to fruit flavored chewing gums.

The term "flavor" is used herein to mean the sensation produced by a material taken in the mouth, perceived principally by the senses of taste and smell. Flavor is also taken to mean the sum of the characteristics of the material which produces that sensation. The term "flavoring agent" is used herein to mean the composition of natural or synthetic oils which produces the flavor sensation. Flavoring agents are well known in the confectionery arts.

Flavors contemplated herein include but are not limited to fruit flavors such as berry, citrus, tropical fruit flavors and the like; herbal such as cinnamon, anise, coriander, eucalyptus, ginseng, fennel and the like; sweet such as honey, caramel, toffee, molasses and the like; and spice such as nutmeg, pepper, cinnamon, caramon, ginger, clove and the like. Other flavors known to those skilled in the art may also be enhanced by the use of low levels of N-ethyl-p-menthane-3-carboxamide.

The enhancement and perceived prolongation of fruit flavors is a preferred application of the present invention. Fruit flavors may be natural or synthetically produced and typically contain a combination of aromatic hydrocarbons such as esters, aldehydes and ketones, essential oils from plant materials such as orange oil, lemon oil or other natural oils, and distillates from botanical ingredients. Fruit flavors include but are not limited to, lemon, orange, lime, apricot, grapefruit, banana, cherry, apple, pineapple, grape, strawberry and blends such as tutti fruitti and fruit punch and the like.

The amounts of the flavoring agent and the N-ethyl-p-menthane-3-carboxamide in the enhanced flavoring composition will be from about 99.96% to about 97.8% of flavoring agent and about 0.04% to about 2.2% of N-ethyl-p-menthane-3-carboxamide, with 0.4% to 1.0% of N-ethyl-p-menthane-3-carboxamide being preferred. The amounts will depend somewhat on such factors as the flavor type, the end use and the effect desired.

The amount of the enhanced flavoring composition to be used in the end product will also be dependent on the flavor type, the end product and the effect desired. In general the enhanced flavoring composition may suitably be used in confectionery compositions in a range of about 0.10% to about 1.0% by weight of the confection with 0.2% to 0.5% preferred. For chewing gums a higher range of about 0.8 to about 3.5% is suitable with 1.0% to 3.0% preferred.

The enhanced flavoring compositions of the present invention may be used in edible products such as hard and soft confections, and chewing gums. The preparation of confectionery formulations is historically well known and has changed little through the years. In general a hard boiled candy confection has a base composed of a mixture of sugar and other carbohydrate bulking agents kept in an amorphous or glassy condition, preferably having from about 0.5% to about 5% moisture. The base normally contains up to about 75% sugar (sucrose) and up to 65% corn syrup, with a higher sucrose to corn syrup ratio. Further ingredients such as flavoring agents, sweetening agents, acidulants, colorants and so forth may also be added. Hard boiled candies may also be prepared from non-fermentable sugars such as sorbitol, mannitol, xylitol, maltitol, erythritol, hydrogenated starch hydrolysates and the like.

Such confectionery may be routinely prepared by conventional methods such as those involving fire cookers, vacuum cookers, and scraped-surface cookers also referred to as high speed atmospheric cookers. Once the candy mass has been properly tempered, it may be cut into workable portions or formed into desired shapes. A variety of forming techniques may be utilized depending upon the shape and size of the final product desired. A general discussion of the composition and preparation of hard confections may be found in E. B. Jackson, Ed. "Sugar Confectionery Manufacture", 2nd edition, Blackie Academic & Professional Press, Glasgow UK, (1990), at pages 129-169.

Similar to hard candy confection, soft candy confection may be utilize this invention. Soft candy includes fondants, caramels toffees, fudge, marshmallows and nougats and the like and may also include jams and jellies. The preparation of soft confections, such as nougat, involves conventional methods, such as the combination of two primary components, namely (1) a high boiling syrup such as a corn syrup, or the like, and (2) a relatively light textured frappe, generally prepared from egg albumin, gelatin, vegetable proteins, such as soy derived compounds, milk derived compounds such as milk proteins, and mixtures thereof. Further ingredients such as the enhanced flavoring agent, flavoring agents, additional carbohydrate bulking agent, colorants, preservatives, medicaments, mixtures thereof and the like may be added thereafter also under agitation. A general discussion of the composition and preparation of such confections may be found in E. B. Jackson, Ed. "Sugar Confectionery Manufacture", 2nd edition, Blackie Academic & Professional Press, Glasgow UK, (1990), at pages 170-235.

Compressed tablet confections and lozenges are also within the scope of edible confectionery compositions of the present invention. Compressed tablet confections contain particular materials and are formed into structures under pressure. These confections generally contain sugars or sugar substitutes in amounts up to about 95%, by weight of the composition, and typical tablet excipients such as binders and lubricants as well as the enhanced flavoring agent, flavoring agents, colorants and so forth. Lozenges are cut from a sheet of firm dough and dried to give a hard sweet with a rough surface. A general discussion of the composition and preparation of such confections may be found in E. B. Jackson, Ed. "Sugar Confectionery Manufacture", 2nd edition, Blackie Academic & Professional Press, Glasgow UK, (1990), at pages 236-258.

The enhanced flavoring compositions may likewise be used in chewing gums. The chewing gum composition generally comprises one or more natural or synthetic elastomer which is supplemented by conventional chewing gum ingredients. These ingredients include one or more solvents, plasticizers, fillers, flavoring agents, coloring agents and/or sweetening agents.

Elastomers which are suitable for use herein include substances of vegetable origin such as chicle, jelutong, gutta percha, guayale and crown gum. Synthetic elastomers such as butadiene-styrene copolymers, isobutylene-isoprene copolymers, polyethylene, polyisobutylene, polyvinylacetate, and mixtures thereof are also useful. The elastomer generally comprises from about 14% to 50% by weight, preferably from about 20% to about 30% by weight, of the chewing gum composition.

The chewing gum composition can contain elastomer solvents to aid in softening the polymer component. Such elastomer solvents can include methyl, glycerol or pentaerythritol esters of rosins or modified rosins, such as hydrogenated, dimerized or polymerized rosins or mixtures thereof. Examples of elastomer solvents suitable for use herein include pentaerythritol ester of partially hydrogenated wood rosin, pentaerythritol ester of wood rosin, glycerol ester of partially dimerized rosin, gylcerol ester of polymerized rosin, glycerol ester of tall oil rosin, glycerol ester of wood rosin, and partially hydrogenated wood rosin, and partially hydrogenated methyl ester of rosin, and mixtures thereof. Terpene resins, including polyterpene and mixtures thereof are also useful. The solvent can be employed in an amount ranging from about 10% to 75% and preferably about 15% to about 50% by weight of the chewing gum composition.

A variety of traditional ingredients used as plasticizers or emulsifiers such as lanolin, lecithin, glycerol monostearate, stearic acid, sodium stearate, potassium stearate, glycerol triacetate, triacetin, glycerine and the like can also be incorporated into the chewing gum composition to obtain a variety of textures and consistency properties. These additional materials also include waxes such as natural waxes, petroleum waxes and microcrystalline waxes and fats and oils including animal fats such as lard and tallow, vegetable oils such as soybean and cottonseed oil, hydrogenated and partially hydrogenated vegetable oil and cocoa butter. These ingredients are generally employed in amounts of up to about 30% by weight, preferably 1% to 25% by weight and more preferably from about 3% to about 7% by weight of the final chewing gum composition.

The chewing gum composition can additionally include conventional coloring agents such as titanium dioxide, in amounts up to 2% and fillers such as dicalcium phosphate, magnesium carbonate, aluminum hydroxide, alumina, aluminum silicates, talc, calcium carbonate, cellulose, and combinations thereof in amounts of from 5 to 35% by weight of the final composition.

The chewing gum composition may also contain bulk sweeteners including sugars such as sucrose, dextrose, maltose, fructose and the like or sugar alcohols such as sorbitol, mannitol, xylitol, maltitol, isomalt, erythritol and hydrogenated starch hydrolysates and combinations thereof. Bulk sweeteners may be present in amounts up to 90% by weight of the final composition. High intensity sweeteners such as aspartame, acesulfame salts, aliatame saccharin and the like may also be present. These sweeteners may be present in amounts of up to 1% by weight of the final gum composition.

The chewing gum may contain flavoring agents in addition to the enhanced flavoring compositions in amounts up to 3.5%. Generally any food additive such as those described in "Chemicals Used In Food Processing", publication 1274, pages 63-258, by the National Academy of Sciences, may be used.

The chewing gum is generally manufactured by methods known in the art by sequentially adding the various chewing gum components to any commercial mixer or extruder in a batch or continuous process. The enhanced flavoring composition of the present invention is added to the chewing gum in the usual manner. After the ingredients have been thoroughly mixed the mass is discharged and cut, rolled, or shaped into the desired form.

The invention is illustrated by the following non-limiting examples.

EXAMPLES

N-ethyl-p-menthane-carboxamide available as "WS-3" supplied by Sterling Organics was used in the Examples.

Example I

Confection

A candy base (478.55 gms) was prepared by mixing a 55/45 ratio of granulated sugar and corn syrup with 47.9 gms of water and cooking the mixture to 145° C. The cooked base was transferred to a cooling table and 21.25 gms of a flavor premix was kneaded into the base while cooling. The flavored candy was formed by rolling through a drop roller. The flavor premix consisted of 20.0 gms salvage, and 1.25 gms flavor for a 0.25% by weight of flavor in the candy.

To a similarly prepared candy base (478.55 gms) was added 21.45 gms of second flavor premix also containing 20.0 gms salvage, and 1.25 gms flavor, with the addition of 0.20 gms of a 5% ethanol solution of N-ethyl-p-menthane-carboxamide (0.01 gms) for a 0.002% by weight of N-ethyl-p-menthane-carboxamide in the candy, and a flavor to N-ethyl-p-menthane-carboxamide ratio of 99.2 to 0.8.

Honey, citrus spice, herbal and apple flavored candies were prepared by the above methods both with and without the N-ethyl-p-menthane-carboxamide in the flavor premix. The four flavor pairs were evaluated as follows:

| FLAVOR | EVALUATION |
|---|---|
| Honey | The carboxamide intensifies the honey character. It provides a better and more pleasant sensation of fullness or roundness to the honey flavor profile. |

-continued

| FLAVOR | EVALUATION |
|---|---|
| Citrus spice | The carboxamide modifies the perception of the citrus spice flavor. It rounds out the flavor by blending the various notes into one flavor perception. |
| Herbal | At this level, the carboxamide intensifies the bitter notes which leads to some distortion. Less than 0.002% would be preferred for this herbal flavor. |
| Apple | The carboxamide brightens and better defines the apple notes of this flavor. |

Nine people, randomly selected, were asked to evaluate the candies compounded with N-ethyl-p-menthane-carboxamide compared with the base candy without the additive. The evaluators were asked if the candy pairs "tasted different". The following shows the number of people finding a different taste for the candy flavored as indicated: Citrus spice—6; apple—5; honey—5; herbal—5.

Example II

Chewing Gum

A. Preparation

1. A citrus flavored chewing gum was prepared by conventional means from 22.0 gms gum base, 69.04 gms sweetener, 0.24 gms high intensity sweetener, 2.97 gms acidulant, 3.85 gms other conventional additives and 1.9 gms citrus flavoring agent. Two additional samples were prepared in which 0.02 gms and 0.04 gms respectively of the sweetener were replaced with the same amount of N-ethyl-p-menthane-carboxamide for a flavor to N-ethyl-p-menthane-carboxamide ratio of 98.96/1.04 and 97.94/2.06 respectively. The control and the two inventive examples were compared as described further below.

2. A cinnamon flavored chewing gum was prepared by conventional means from 22.0 gms gum base, 73.29 gms sweetener, 0.81 gms high intensity sweetener, 2.1 gms other conventional additives and 1.8 gms cinnamon flavoring agent. Two additional samples were prepared in which 0.02 gms and 0.04 gms respectively of the sweetener were replaced with the same amount of N-ethyl-p-menthane-carboxamide for a flavor to N-ethyl-p-menthane-carboxamide ratio of 98.90/1.10 and 97.83/2.17 respectively. The control and the two inventive examples were compared as described further below.

B. Comparisons:

At a N-ethyl-p-menthane-carboxamide usage level of 0.02% the release of N-ethyl-p-menthane-carboxamide was expected to be about 50 ppm and at 0.04% usage level the release was expected to be about 100 ppm. The flavor enhanced gum products were compared with the corresponding control samples by a panel of six people who were asked to evaluate the samples by commenting on perceived flavor differences and flavor liking. Four of the six panelists noted differences in the samples summarized as follows:

| FLAVOR | N-ETHYL-P-MENTHANE-CARBOXAMIDE USAGE LEVEL | EVALUATION |
|---|---|---|
| citrus | 0 | good upfront citrusy impact with sweet sour notes |

| FLAVOR | N-ETHYL-P-MENTHANE-CARBOXAMIDE USAGE LEVEL | EVALUATION |
|---|---|---|
| citrus | 0.02% | more citrusy, better defined and better perceived acid character |
| citrus | 0.04% | peely notes very defined, sharper acid notes with perceived bitterness and slight tingly/sensate cue |
| cinnamon | 0 | sweet cinnamon character with slight burning sensation |
| cinnamon | 0.02% | defined difference; cinnamon spice character better defined with a perceived burn sensation |
| cinnamon | 0.04% | cinnamon character has a harsh woody note and more burning sensation. |

For both the citrus and the cinnamon flavors, 0.02 gms of N-ethyl-p-menthane-carboxamide provided a preferred enhancement of the flavors. At 0.04 gms, while the flavors were enhanced, less desirable notes were also perceived.

We claim:

1. A chewing gum containing a flavoring effective amount of an enhanced fruit flavoring composition, said enhanced fruit flavoring composition comprising:
    (a) one or more fruit flavoring agents selected from the group consisting of lemon, orange, lime, apricot, grapefruit, banana, cherry, apple, pineapple, grape, strawberry, tutti fruitti, and fruit punch, wherein said fruit flavoring agent is present at about 97.8 to about 99.96% by weight of said enhanced fruit flavoring composition, and,
    (b) an amount of N-ethyl-p-menthane-3-carboxamide effective to enhance said fruit flavoring agent wherein said N-ethyl-p-menthane-3-carboxamide is present at about 0.04 to about 2.2% by weight of said enhanced fruit flavoring composition, and;
    wherein said enhanced fruit flavoring composition is present at about 0.8% to about 3.5% by weight of said chewing gum.

2. The chewing gum according to claim 1 wherein said enhanced fruit flavoring composition is present at 1.0% to 3.0%.

3. A chewing gum containing a flavoring effective amount of an enhanced fruit flavoring composition, said enhanced fruit flavoring composition comprising:
    (a) one or more fruit flavoring agents selected from the group consisting of citrus flavors and berry flavors, wherein said fruit flavoring agent is present at about 97.8 to about 99.96% by weight of said enhanced fruit flavoring composition, and,
    (b) an amount of N-ethyl-p-menthane-3-carboxamide effective to enhance attributes of said citrus and berry flavors, wherein said N-ethyl-p-menthane-3-carboxamide is present at about 0.04 to about 2.2% by weight of said enhanced fruit flavoring composition, and;
    wherein said enhanced fruit flavoring composition is present at about 0.8% to about 3.5% by weight of said chewing gum.

4. The chewing gum according to claim 3 wherein said enhanced fruit flavoring composition is present at 1.0% to 3.0%.

* * * * *